Oct. 16, 1956  H. O. EGLI  2,766,531
MICROMETER HEIGHT GAUGE
Filed March 1, 1955
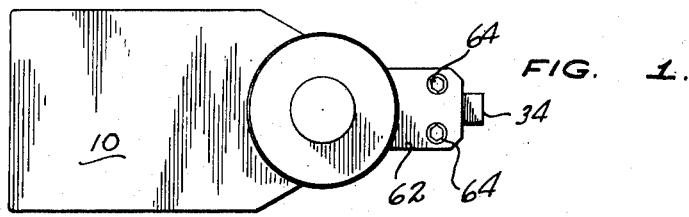
FIG. 1.
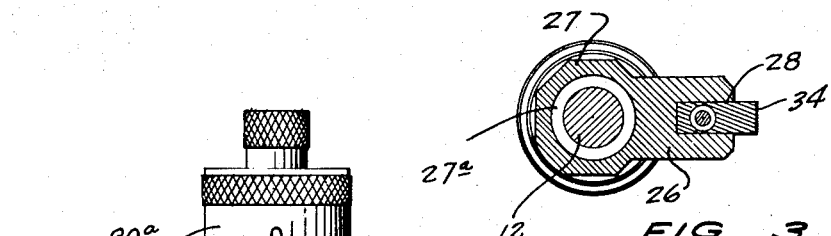
FIG. 3.
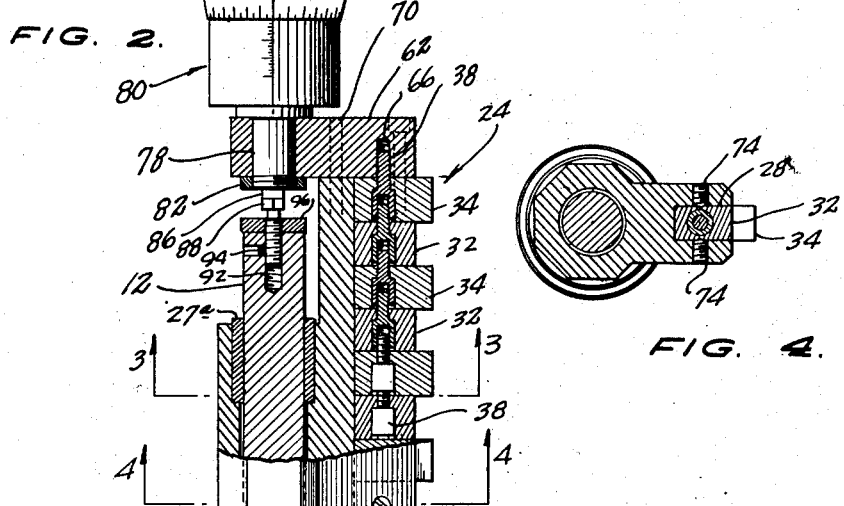
FIG. 2.
FIG. 4.
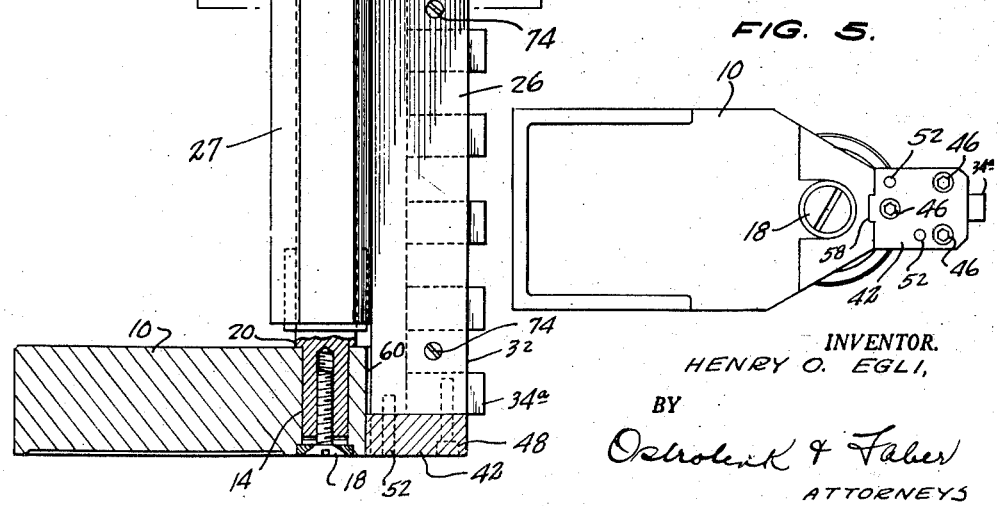
FIG. 5.
INVENTOR.
HENRY O. EGLI,
BY
Ostrolenk & Faber
ATTORNEYS

United States Patent Office 2,766,531
Patented Oct. 16, 1956

2,766,531
MICROMETER HEIGHT GAUGE
Henry O. Egli, Sidney, N. Y.

Application March 1, 1955, Serial No. 491,425

14 Claims. (Cl. 33—170)

This invention relates to gauges and more particularly to gauges for measuring the heights of work pieces using a machinist's table surface as a reference level.

It is an object of my invention to provide a height gauge which will accurately measure work piece heights to less than one ten thousandths of an inch.

It is another object to provide a height gauge which will have a vertically movable gauge bar having a series of spaced dimension indicators, wherein said gauge bar may be manufactured to an extreme degree of accuracy as a mass production unit.

It is a further object of my invention to provide a height gauge having a gauge bar which may be economically manufactured of a plurality of gauge blocks individually joined to each other.

It is still a further object of my invention to provide a height gauge which may be readily assembled and which will be simple and easy to operate, including certain adjustment means whereby a micrometer head, incorporated as part of the device, may readily be set at zero, with the lower end of the gauge bar resting on a reference surface.

These and other objects and features of my invention will be apparent from the description which follows:

Briefly, my invention comprises a device having a base to which is secured an upright post, there being a gauge bar slidable on the post in response to rotation of a standard micrometer. The gauge bar is so constructed as to have a series of blocks of equal dimension fastened to each other in superimposed relationship. Intermediate blocks are foreshortened so as to effect a series of spaced dimension indicators of the remaining blocks. Thus, the gauge bar, being a composite structure, may be manufactured much more readily than equivalent prior art bars wherein the dimension indicators were machined from a single element. For example, in following the practice of the prior art, should an error occur in the machining of any one of a plurality of the protruding indicating elements the entire bar is considered defective. Further, the difficulties and expense of machining accurately dimensioned elements in an integral bar are considerably reduced by the practice of my invention.

Thus, in such prior art patents as Bennett #2,515,583 and Bauer #2,544,004, the gauge bars have protruding dimension indicators which are machined from the material of the bar. It will be readily apparent that should any of these elements be inaccurately machined insofar as vertical dimension is concerned a proper measurement cannot be made utilizing that particular element. Accordingly, the entire bar must be discarded, even though all of the other elements were accurately tooled. By providing a composite bar in accordance with my invention, any element which has been inaccurately machined may be discarded; without, however, discarding all of the remaining elements which go to make up the bar.

A detailed description of my invention now follows in conjunction with the appended drawing, in which:

Fig. 1 is a plan view.

Fig. 2 is a partial section showing an elevation of the device.

Fig. 3 is a section through 3—3 of Fig. 2.

Fig. 4 is a section through 4—4 of Fig. 2

Fig. 5 is a bottom plan view.

With reference now to the drawing, my novel structure comprises a base 10 to which is secured a post 12 in a bore 14 as by a bolt 18. It will be noted that the lowermost portion of the post is turned so as to effect a seating shoulder 20 on the base.

Slidably arranged on post 12 is a gauge bar 24 comprising a holder 26. The holder has an integral sleeve 27 suitably bushed as at 27a, at both ends, for smooth sliding on post 12. The holder also has a channel 28 which accommodates a series of gauge blocks such as 32 and 34 which are of equal vertical dimension, the blocks 32 being foreshortened.

Each gauge block is provided with a bore and a counterbore having aligned axes so as to accommodate a hermaphrodite bolt such as 38. The bolts are shouldered so as to firmly engage against the shoulder of the counterbore in each gauge block, as will be apparent from Figure 2. The gauge blocks are secured to each other by virtue of the threaded connection between the male portion of each hermaphrodite bolt in the female portion of the adjoining bolt.

The column of blocks is fastened to the micrometer holder 62. The base block 42 is less than the thickness of one gauge block and clears the surface plate (not shown) on which the gauge stands. Also, locating pins such as 52 are provided for initial alignment of the end piece 42 with the holder and suitable screws 46 are provided for securing the elements of the device. A smoothly sliding tongue and groove arrangement between end block 42 and base 10 is provided by virtue of the tongue 58 accommodated in the groove 60.

The stack of blocks is secured at its top end by a micrometer holder 62 fastened by bolts 64 to the top edge surfaces of the sides of the channel 28 and is also provided with a threaded bore 66 for taking the male portion of the uppermost hermaphrodite bolt 38. One or more locater pins such as 70 may be utilized to properly position the micrometer holder 62 with respect to the gauge block holder 26.

The channel sides are preferably provided with set screws such as 74 set a slight distance away from the stack to prevent damage if the stack is accidentally bumped. Groove 28 is made somewhat oversize as a manufacturing convenience so that the gauge blocks may be readily thrust therein.

Carried in a bore 78 of micrometer holder 62 is a conventional micrometer mechanism 80. The micrometer 80 is secured to the holder by a nut 82 and protruding from the micrometer is a spindle 86 which engages an anvil 88 and is separable therefrom. The anvil 88 has a threaded engagement axially in the post 12 by means of the threaded bore 92. A brass locking shoe 94 passes through a bore in the post to engage and grip a threaded portion of the anvil shank, as shown in Figure 2, and a locking collar 96 threadedly engages the anvil shank and presses against the top surface of the post 12 so as to hold the anvil in any adjustable position with respect to the post.

It will be apparent that when the end block 42 and base 10 are resting flush on a machinists' table the micrometer may be rotated to give a zero reading and the anvil 88 may then be adjusted so as to just contact the spindle 86 and then secured in that position by means of the locking collar 96. As illustrated in Figure 2, the micrometer is at zero position and the part 42 is flushed with the table. The instrument is now ready for use.

From the foregoing description operation of my device will be evident. Thus, the micrometer thimble 80a is rotated so that spindle 86 bears down on the anvil 88 whence the gauge bar 24 will rise. Conversely, reverse rotation of thimble 80a will permit the gauge bar 24 to move downwardly. The height of a work piece resting on the same table as the instrument may then be readily and accurately measured by well understood procedure.

In assembling the stack of gauge blocks it is preferable to tighten each block to the adjoining block with a torque wrench so that each of the blocks will be compressed to the same degree. A particular effect of the use of individual joining of the blocks is that it avoids column action, which causes inaccurate results, were the blocks to be assembled by means of through bolts. Further, it will be apparent as an inherent feature of the stack of blocks that considerable accuracy can be achieved by assembling the blocks in such a manner that any error in one block may be corrected by the use of an adjoining block having a compensating error. Thus, if one block is off, say, by minus ten millionths, the overall dimension can be made correct by selecting the next adjoining block as one having a plus ten millionths error.

I am aware that my invention may be modified by persons skilled in the art without departing from the spirit thereof; accordingly, I do not seek to be limited to the precise illustration herein given except as set forth in the appended claims.

I claim:

1. A height gauge comprising a base, a stack of gauge blocks extending therefrom demarcating a succession of distance increments, and micrometer means for moving said stack with respect to said base and registering the degree of such motion, wherein said means for moving said stack comprises an elongated holder member having a channel longitudinally disposed therein, said stack being accommodated within said channel and extending laterally therefrom and being movable with said holder.

2. A height gauge comprising a base, a stack of gauge blocks extending therefrom demarcating a succession of distance increments, and micrometer means for moving said stack with respect to said base and registering the degree of such motion, wherein said means for moving said stack comprises an elongated holder member having a channel longitudinally disposed therein, said stack being accommodated within said channel and extending outwardly therefrom and being movable with said holder, means intermediate adjoining blocks securing said adjoining blocks to each other so as to form said stack, and means secured to said holder and closing the ends of said channel and being secured to the corresponding outer ends of said stack.

3. A height gauge comprising a base, a stack of gauge blocks extending therefrom demarcating a succession of distance increments, and micrometer means for moving said stack with respect to said base and registering the degree of such motion, wherein said means for moving said stack comprises an elongated holder member having a channel longitudinally disposed therein, said stack being accommodated within said channel and extending outwardly therefrom and being movable with said holder, means intermediate adjoining blocks securing said adjoining blocks to each other so as to form said stack, and means secured to said holder and closing the ends of said channel and being secured to the corresponding outer ends of said stack, one of said latter means having a gauging dimension in the longitudinal direction of said stack and being an operative part of said stack for measuring purposes.

4. A height gauge comprising a base, a stack of gauge blocks extending therefrom demarcating a succession of distance increments, and micrometer means for moving said stack with respect to said base and registering the degree of such motion, said micrometer means including a spindle secured to said stack and an anvil secured to said base, said spindle being engageable with said anvil to exert thrust thereon for moving said stack, said anvil being adjustable with respect to said base in axial alignment with said spindle so as to effect a "zero" indication on said micrometer when said stack and said base are resting flush on a surface.

5. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means.

6. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, including an anvil carried by said post and being engageable by said spindle to take the thrust thereof, said anvil being adjustable axially of said post.

7. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said holder having a channel, said stack being carried in said channel and extending therefrom wherein the gauging dimensions of said blocks are in longitudinal alignment with said channel.

8. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said gauge blocks being serially attached to each other to form said stack.

9. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said gauge blocks being serially attached to each other to form said stack, said holder having a longitudinal channel in which said stack is disposed, alternate blocks extending transversely out of said channel.

10. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said gauge blocks being serially attached to each other to form said stack, said holder having a longitudinal channel in which said stack is disposed, alternate blocks extending transversely out of said channel, including set screws in said holder passing transversely into said channel and engageable with at least one block in said stack on opposite sides thereof.

11. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said gauge blocks being serially attached to each other to form said stack, said holder having a longitudinal channel in which said stack is disposed, alternate blocks extending transversely out of said channel, including a member closing each end of said channel and being secured to the corresponding outer end block of said stack, one of said members serving as a lowermost gauge block at the bottom of said stack.

12. A height gauge comprising a base, a post secured to said base and extending upwardly therefrom, a stack of gauge blocks in vertical alignment demarcating a plurality of successive vertical dimensions, a holder to which said stack is secured, said holder being slidably disposed on said post, and rotary micrometer means carried by said holder and having a spindle disposed to exert a thrust on said post for moving said holder with respect thereto, the degree of motion of said holder being registered on said micrometer means, said gauge blocks being serially attached to each other to form said stack, said holder having a longitudinal channel in which said stack is disposed, alternate blocks extending transversely out of said channel, including a member closing each end of said channel and being secured to the corresponding outer end block of said stack, one of said members serving as a lowermost gauge block at the bottom of said stack, the other of said members serving as a holder for said micrometer means.

13. In a measuring instrument, a series of gauge blocks superimposed on each other in a column, said blocks being serially secured to each other by individually stressable tensile fastening means passing through each of said blocks to predetermine the degree of compression on each block, each block having a smooth bore provided with a counterbore for accommodating respective fastening means, and fastening means having shoulders compressively engaging the margins of respective counterbores.

14. In a measuring instrument, a series of gauge blocks superimposed on each other in a column, a plurality of hermaphrodite bolts, said blocks being serially secured to each other by said hermaphrodite bolts, each of said blocks having a throughbore provided with a counterbore to accommodate one such bolt, wherein said bolts extend between individual blocks to secure said blocks together into an integral column, each bolt having a shoulder seating in said counterbore.

References Cited in the file of this patent

UNITED STATES PATENTS

| | | |
|---|---|---|
| 1,932,626 | Horan | Oct. 31, 1933 |
| 2,515,583 | Bennett | July 18, 1950 |
| 2,713,208 | Bizzoco et al. | July 19, 1955 |
| 2,722,748 | Triantos | Nov. 8, 1955 |